United States Patent [19]

Pissiotas

[11] 3,897,474
[45] July 29, 1975

[54] THIOL AND DITHIOL CARBAMATE ACID ESTER DERIVATIVES OF PHENYL FORMAMIDINE

[75] Inventor: Georg Pissiotas, Lorrach, Germany

[73] Assignee: Ciba-Geigy Corporation, Ardsley, N.Y.

[22] Filed: Oct. 9, 1973

[21] Appl. No.: 404,467

[30] Foreign Application Priority Data
Oct. 12, 1972 Switzerland.................. 14964/72
July 31, 1973 Switzerland.................. 11055/73

[52] U.S. Cl................. 260/455 A; 424/300; 71/72; 71/100; 71/101
[51] Int. Cl.² ............... C07C 155/02; C07C 155/04
[58] Field of Search .............................. 260/455 A

[56] References Cited
UNITED STATES PATENTS
3,261,858  6/1966  D'Amico .................. 260/455 A
3,736,343  5/1973  Olin ....................... 260/455 A
3,823,179  6/1974  Fuchs ..................... 260/455 A Primary Examiner—Lewis Gotts
Assistant Examiner—D. R. Phillips
Attorney, Agent, or Firm—Harry Falber; Frederick H. Rabin

[57] ABSTRACT

Thio- and dithiocarbamate formamidines of the formula

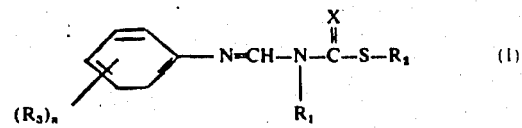

wherein $R_1$ represents hydrogen, alkyl, alkenyl, alkinyl, or aralkyl, $R_2$ represents alkyl, alkenyl, alkinyl, alkoxyalkyl, alkylthioalkyl, or aralkyl, $(R_3)_n$ represents one or more similar or different radicals, such as hydrogen, halogen, alkyl, alkoxy, alkylthio, alkenyloxy, cyano, nitro, dialkylamino, or carbalkoxy, $n$ is 1 to 5, and X represents oxygen or sulphur, processes for their manufacture and their use in pest control.

20 Claims, No Drawings

THIOL AND DITHIOL CARBAMATE ACID ESTER DERIVATIVES OF PHENYL FORMAMIDINE

The present invention relates to thio- and dithiocarbamate formamidines, process for their manufacture, and to their use in pest control.

The thiocarbamate and dithiocarbamate formamidines have the formula

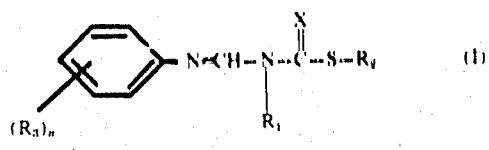

wherein $R_1$ represents hydrogen, alkyl, alkenyl, alkinyl, or aralkyl, $R_2$ represents alkyl, alkenyl, alkinyl, alkoxyalkyl, alkylthioalkyl, or aralkyl, $(R_3)_n$ represents one or more similar or different radicals, such as hydrogen, halogen, alkyl, alkoxy, alkylthio, alkenyloxy, cyano, nitro, dialkylamino, or carbalkoxy, $n$ is 1 to 5, and X represents oxygen or sulphur.

The alkyl, alkyloxy, alkoxyalkyl, alkylthio, alkylthioalkyl, alkenyl, alkenyloxy, alkinyl, or alkinyloxy groups that are possible for $R_1$, $R_2$, and $R_3$ have 1 to 18, in particular 1 to 12, carbon atoms in the chain; the alkenyl and alkinyl chains have 3 to 18, but preferably 1 to 4 and 3 to 5 carbon atoms respectively. These groups can be straight-chain or branched, substituted or unsubstituted. Possible substituents are preferably halogen atoms, cyano, hydroxyl, alkoxy, and alkylthio groups. By halogen is meant fluorine, chlorine, bromine and/or iodine. Examples of such groups include: methyl, methoxy, methylthio, ethyl, ethylthio, ethoxy, trifluoromethyl, chloroethyl, chloroethyl, propyl, isopropyl, n-, i-, sec. and tert. butyl, allyl, allyloxy, methallyl, propargyl, n-butinyl, isobutinyl.

Aralkyl groups represented by $R_1$ and $R_2$ are to be understood as meaning in particular benzyl or phenethyl groups that are unsubstituted or substituted by halogen, especially by chlorine, alkyl with 1 to 4 carbon atoms and alkoxy with 1 to 4 carbon atoms. By carbalkoxy as represented by $R_3$ is meant for example methoxycarbonyl.

Preferred compounds on account of their action are those of the formula I, wherein $R_1$ represents hydrogen, alkyl with 1 to 4 carbon atoms, alkenyl with 3 to 4 carbon atoms, alkinyl with 3 to 5 carbon atoms or unsubstituted benzyl, $R_2$ represents alkyl with 1 to 4 carbon atoms, alkenyl with 3 to 4 carbon atoms, alkinyl with 3 to 5 carbon atoms, alkoxyalkyl with 1 to 4 carbon atoms in each of the moieties, unsubstituted benzyl or benzyl which is substituted by one or more chlorine atoms, $(R_3)_n$ represents one or more similar or different radicals, such as hydrogen, fluorine, chlorine, bromine, methyl, trifluoromethyl, methoxy, methylthio, ethyl, ethoxy, ethylthio, chloroethyl, propyl, isopropyl, n-butyl, allyloxy, cyano, nitro, dimethylamino, or methoxycarbonyl, $n$ is 1 to 3, and X represents oxygen or sulphur.

The compounds of the formula I can be manufactured e.g. by the following known methods: for thiocarbamate formamidines:

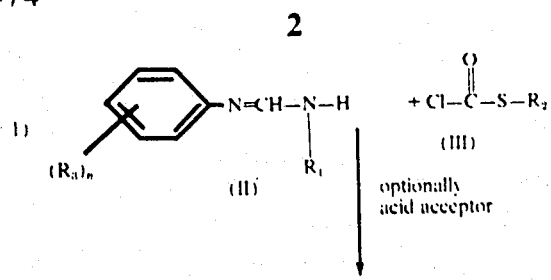

Compounds of the formula I, wherein X = O.

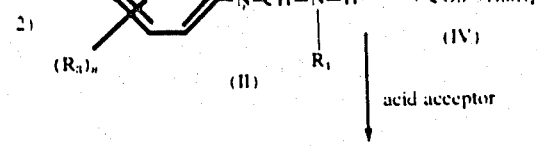

Compounds of the formula I, wherein X = O.
For dithiocarbamate formamidines:

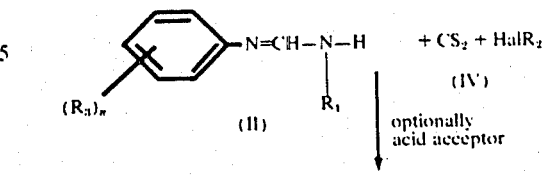

Compounds of the formula I, wherein X = S.

In the formulae II to IV, $R_1$, $R_2$, $R_3$, and $n$ have the meanings given for the formula I.

Examples of suitable acid acceptors are: formamidines of the formula II; tertiary amines, such as triethylamine, dimethylaniline, pyridine, inorganic bases, such as hydroxides and carbonates of alkali and alkaline earth metals, preferably sodium and potassium carbonate.

The reaction is carried out preferably in solvents or diluents which are inert towards the reactants. Examples of suitable solvents or diluents are: aromatic hydrocarbons, such as benzene, toluene, benzenes, halogenated hydrocarbons chlorobenzene, polychlorobenzene, bromobenzene, chlorinated alkanes with 1 to 3 carbon atoms; ethers, such as dioxan, tetrahydrofuran; esters, such as ethyl acetate; ketones, such as methyl ethyl ketone, diethyl ketone, nitriles etc.

Some of the starting materials of the formula II are known compounds which can be manufactured by methods which are known per se.

The compounds of the formula I display a broad biocidal activity and can be used for combating diverse plant and animal pests and as abscission agents and defoliants.

In particular, however, they possess insecticidal and acaricidal properties and may be used against all development stages, e.g. eggs, larvae, pupae, nymphs and adults, of insects and representatives of the order Acarina, for example against insects of the families: Blattidae, Gryllidae, Gryllotalpidae, Tettigoniidae, Cimicidae, Phyrrhocoridae, Reduviidae, Aphididae, Delphacidae, Diaspididae, Pseudococcidae, Chrysomelidae, Coccinellidae, Bruchidae, Scarabaeidae, Dermestidae, Tenebrionidae, Tineidae, Noctuidae, Lymantriidae, Pyralidae, Culicidae, Tripulidae, Stomoxydae, Muscidae, Calliphoridae, Trypetidae, Pulicidae, as well as Acaridae of the families: Ixodidae, Argasidae, Tetranychidae, Dermanyssidae.

The insecticidal or acaricidal action can be substantially broadened and adapted to given circumstances by the addition of other insecticides and/or acaricides. Examples of suitable additives are: organic phosphorus compounds, derivatives of nitrophenols, formamidines, ureas, carbamates, and/or chlorinated hydrocarbons.

The active substances of the formula I are also suitable for combating representatives of the division Thallophyta, e.g. viruses, bacteria and fungi. They thus possess fungicidal properties against phytophathogenic fungi on various cultivated plants, such as cereals, maize, rice, vegetables, ornamental plants, fruit trees, vines, farm products, etc.

With the new active substances it is possible to control or destroy fungi occurring on fruit, blossom, leaves, stems, tubers and roots, and from which parts of plants which grow later then also remain free. The active substances of the formula I are active in particular against phytopathogenic fungi belonging to the following classes: Oomycetes, Zygomycetes, Ascomycetes, Basidiomycetes, Denteromycetes.

In addition, the new active substances can also be used for treating seeds, fruit, tubers etc., and protecting them from fungus infections, for example from smut fungi of all kinds, such as Ustilaginales, and for combating phytopathogenic nematodes.

The compounds of the formula I may be used as pure active substance or together with suitable carriers and/or additives. Suitable carriers and additives can be solid or liquid and correspond to the substances conventionally used in formulation technique, for example natural or regenerated substances, solvents, dispersants, wetting agents, adhesives, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology. Mention is also to be made of cattle dips and spray races, in which aqueous prepartions are used.

The agents according to the invention are manufactured in known manner by intimately mixing and/or grinding active substances of the formula I with the suitable carriers, optionally with the addition of dispersants or solvents which are inert towards the active substances. The active substances may take, and be used in, the following forms:

Solid forms:

Dusts, Tracking agents, granules, coated granules, impregnated granules and homogeneous granules.

Liquid forms:

a. active substances which are dispersible in water: wettable powders, pasts, emulsions;

b. solutions.

The content of active substance in the above described agents is between 0.1% to 95%, in which connection it should be mentioned that, in the case of application from aircraft or some other suitable means of application, it is possible to use concentrations of up to 99.5% or even pure active substance.

The active substances of the formula I can, for example, be formulated as follows:

Dusts

The following substances are used to manufacture (a) a 5% and (b) a 2% dust:

a. 5 parts of active substance
   95 parts of talcum
b. 2 parts of active substance
   1 part of highly disperse silicic acid
   97 parts of talcum.

The active substances are mixed with the carriers and ground.

Granules

The following substances are used to produce 5% granules:

5 parts of active substance,
0.25 parts of epichlorohydrin,
0.25 parts of cetyl polyglycol ether,
3.50 parts of polyethylene glycol,
91 parts of kaolin (particle size 0.3 - 0.8 mm).

The active substance is mixed with epichlorohydrin and dissolved with 6 parts of acetone; the polyethylene glycol and cetyl polyglycol ether are then added. The thus obtained solution is sprayed on kaolin, and the acetone subsequently evaporated in vacuo.

Wettable powoder:

The following constituents are used for the preparation of (a) a 40%, (b) and (c) a 25%, and (d) a 10% wettable powder:

a. 40 parts of active substance,
   5 parts of sodium lignin sulphonate,
   1 part of sodium dibutyl-naphthalene sulphonate,
   54 parts of silicic acid.
b. 25 parts of active substance,
   4.5 parts of calcium lignin sulphonate,
   1.9 parts of Champagne chalk/hydroxyethyl cellulose mixture (1:1),
   1.5 parts of sodium dibutyl naphthalene sulphonate,
   19.5 parts of silicic acid,
   19.5 parts of Champagne chalk,
   28.1 parts of kaolin
c. 25 parts of active substance,
   2.5 parts of isooctylphenoxy-polyoxyethyleneethanol,
   1.7 parts of Champagne chalk/hydroxyethyl cellulose mixture (1:1),
   8.3 parts of sodium aluminium silicate,
   16.5 parts of kieselguhr,
   46 parts of kaolin.
d. 10 parts of active substance,
   3 parts of a mixture of the sodium salts of saturated fatty alcohol sulphates,
   5 parts of naphthalenesulphonic acid/formaldehyde condensate,
   82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to produce (a) a 10% and (b) a 25% emulsifiable concentrate:

a. 10 parts of active substance,
   3.4 parts of epoxidised vegetable oil,
   13.4 parts of a combination emulsifier consisting of fatty alcohol polyglycol ether and alkylaryl sulphonate calcium salt,
   40 parts of dimethylformamide, 43.2 parts of xylene,
b. 25 parts of active substance,
2.5 parts of epoxidised vegetable oil,
10 parts of an alkylarylsulphonate/fatty alcohol-glycol ether mixture,
5 parts of dimethylformamide,
57.5 parts of xylene.

From these concentrates it is possible to produce, by dilution with water, emulsions of any desired concentration.

Spray:

The following constituents are used to prepared a 5% spray:

5 parts of active substance,
1 part of epichlorohydrin,
94 parts of benzene (boiling limits 160°C-190°C).

EXAMPLE 1

Manufacture of N-(2-methyl-4-chlorophenyl)-N'methyl-N'-benzyldithiocarbamoyl-formamidine 7.6 g of $CS_2$ and 11 g of triethylamine are added simultaneously with stirring to a solution of 18 g of N-(2-methyl-4-chlorophenyl)N'-methyl-formamidine in 150 ml of ethanol, the temperature being kept at 0°C. Immediately afterwards 13 g of benzyl chloride are added, whereupon the temperature rises to 30°C. The reaction mixture is stirred for 12 hours at room temperature, then poured into water and extracted with benzene. The benzene solution is dried over sodium sulphate and evaporated in vacuo. The resulting dark oil soon solidifies to a crystalline substance. Recrystallisation from methanol yields the compound of the formula

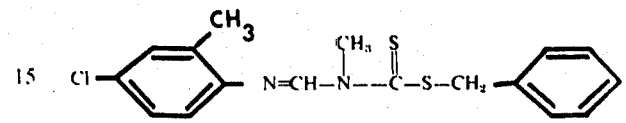

with a melting point of 96°–99°C.

The following compounds are also manufactured in analogous manner:

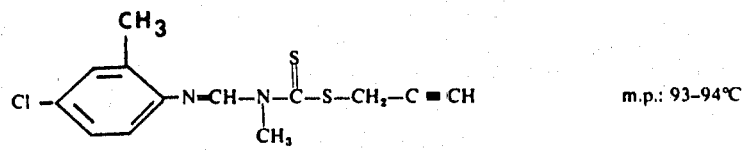   m.p.: 93–94°C

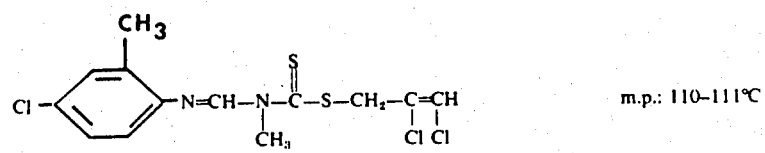   m.p.: 110–111°C

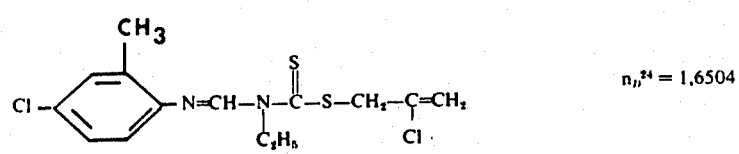   $n_D^{24} = 1.6504$

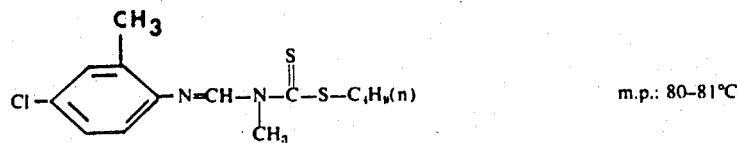   m.p.: 80–81°C

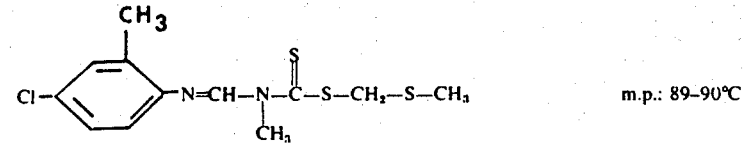   m.p.: 89–90°C

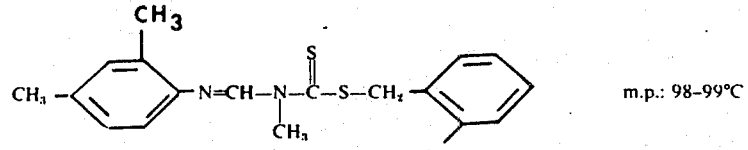   m.p.: 98–99°C

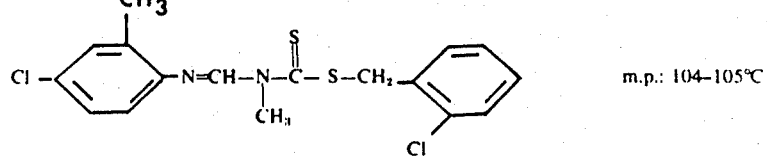   m.p.: 104–105°C

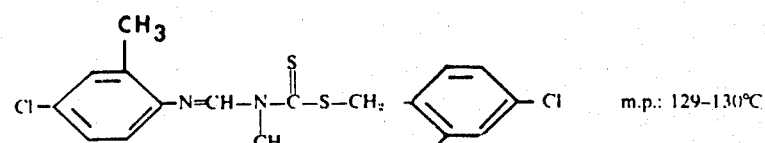   m.p.: 129–130°C

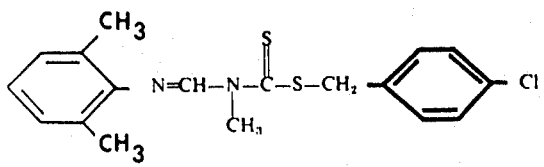 $n_D^{21} = 1.6524$
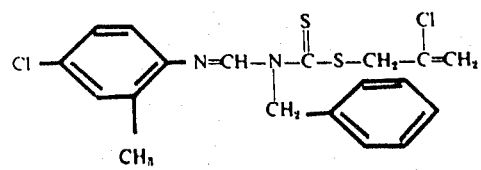 m.p.: 57–59°C
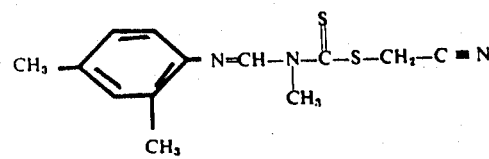 m.p.: 128–129°C
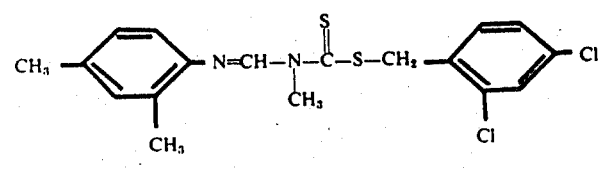 m.p.: 145–147°C
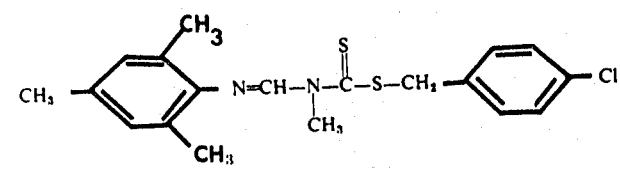 m.p.: 78–81°C
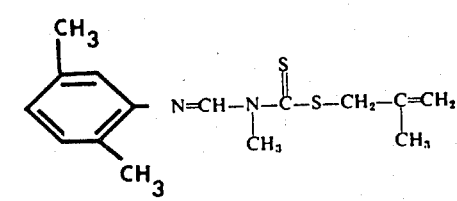 $n_D^{23} = 1.6358$
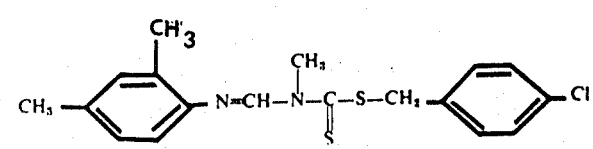 m.p.: 95–96°C
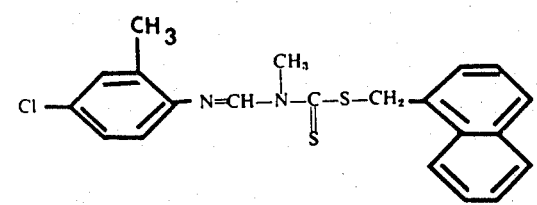 m.p.: 112–113°C
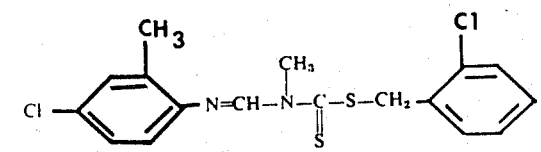 m.p.: 130–131°C
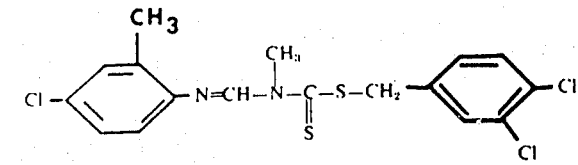 m.p.: 142–143°C

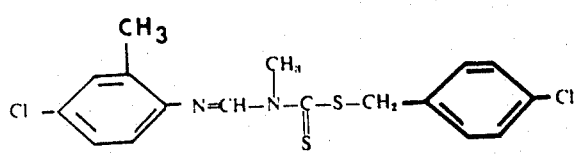 m.p.: 110–111°C
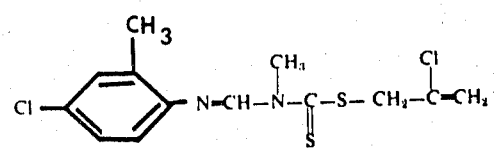 m.p.: 84–85°C
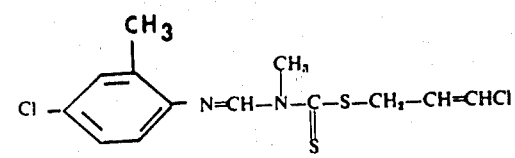 m.p.: 78–80°C
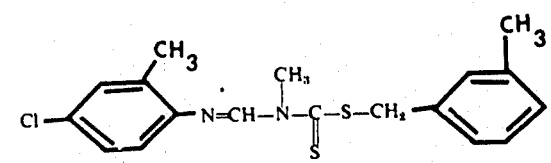 m.p.: 104–107°C
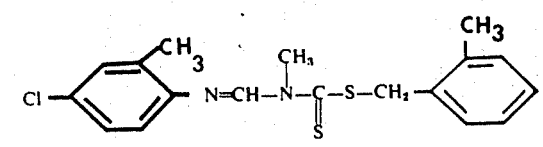 m.p.: 104–107°C
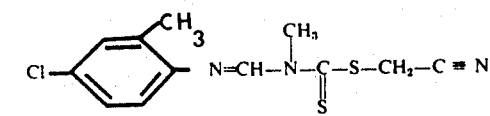 m.p.: 138–139°C
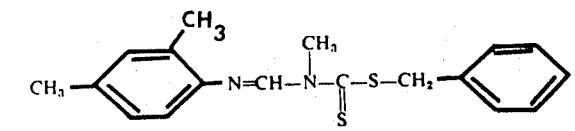 m.p.: 79°C
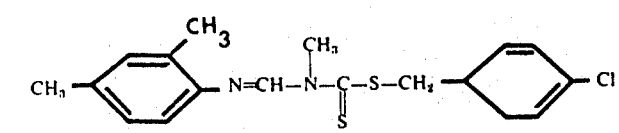 m.p.: 116–118°C
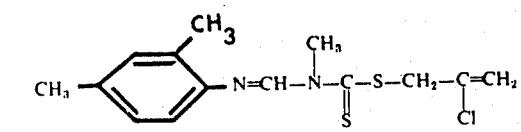 m.p.: 77–78°C
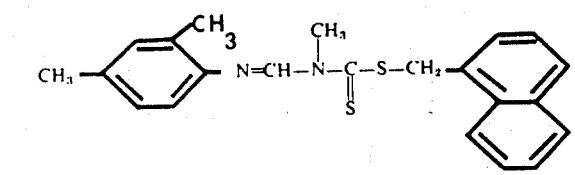 m.p.: 110–112°C
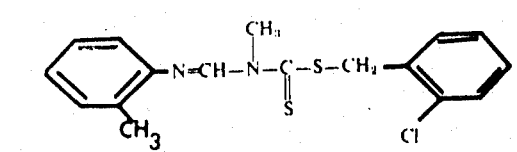 m.p.: 83–84°C

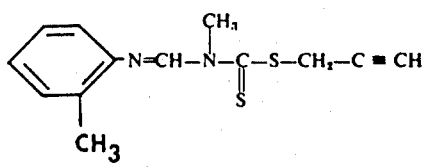 m.p.: 67–68°C
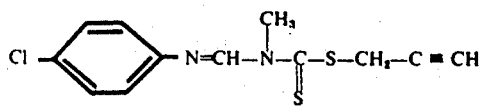 m.p.: 96–99°C
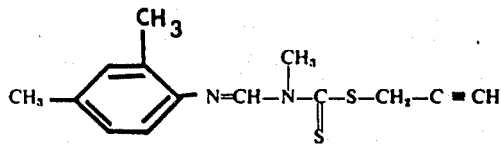 m.p.: 89–91°C
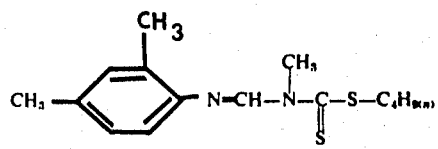 m.p.: 70–73°C
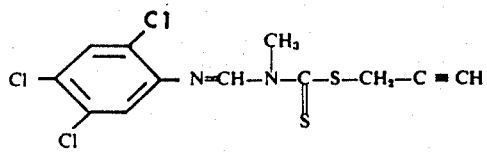 m.p.: 122–123°C
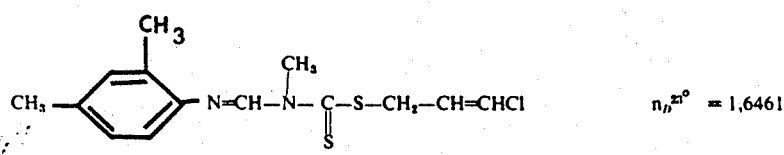 $n_D^{21°} = 1.6461$
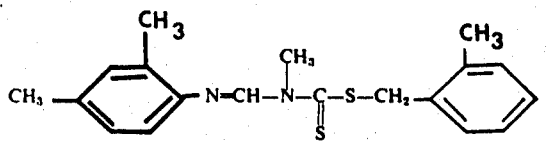 m.p.: 73–74°C
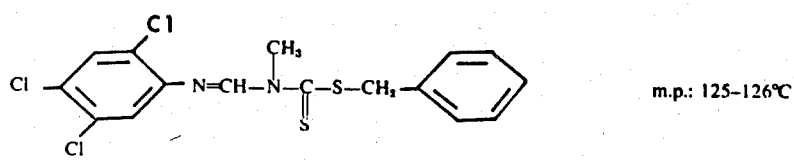 m.p.: 125–126°C
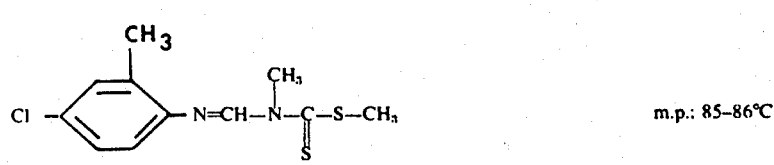 m.p.: 85–86°C
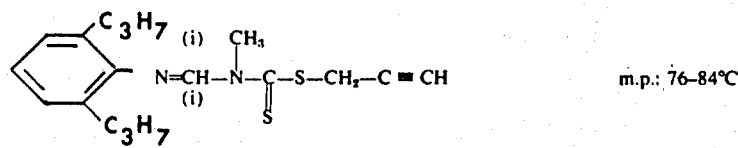 m.p.: 76–84°C
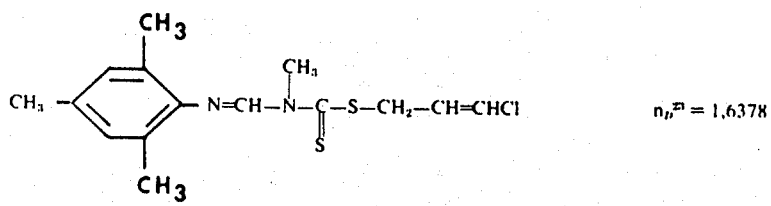 $n_D^{21} = 1.6378$

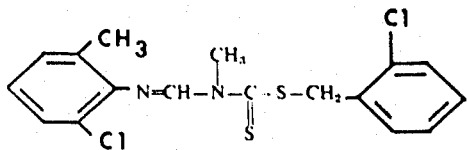 m.p.: 78–80°C

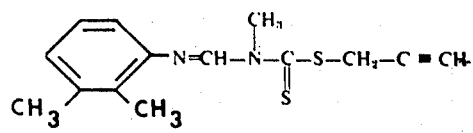 m.p.: 78–79°C

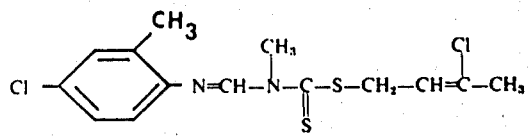 m.p.: 93–94°C

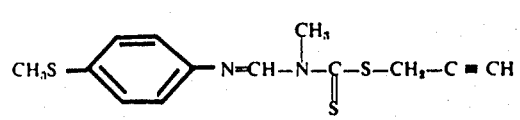 m.p.: 94–95°C

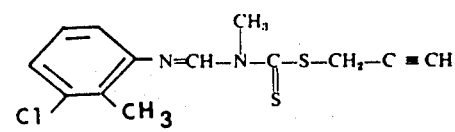 m.p.: 88–89°C

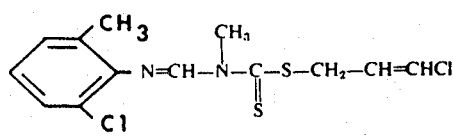

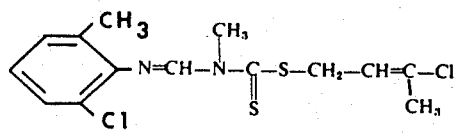

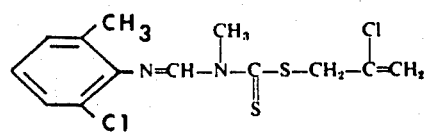

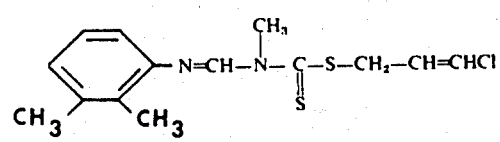

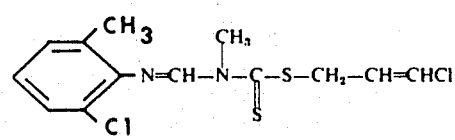

EXAMPLE 2

Manufacture of N-(2,4-dimethylphenyl)-N'-methyl-N'-sec. butyl-thiocarbamoyl-formamidine 23g of chlorothioformic acid sec. butyl ester are added dropwise with stirring to a solution of 49 g of N-(2,4-dimethylphenyl)N'-methyl-formamidine in 350 m. of dry benzene, the temperature being kept at 5°–10°C. The reaction mixture is stirred for 12 hours, then the resulting hydrochloride salt of the formamidine simultaneously used as acid acceptor is filtered off, washed with benzene, and the benzene solution is evaporated in vacuo to give the compound of the formula

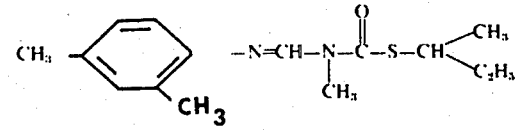

as a pale yellow oil with a refractive index of $n_D^{25} = 1.5666$. The following compounds are manufactured in analogous manner:

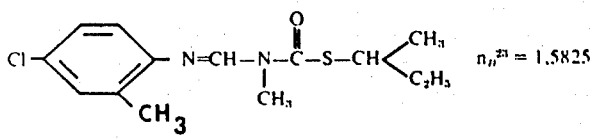
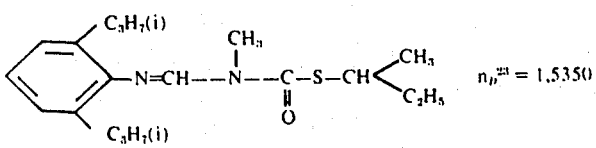
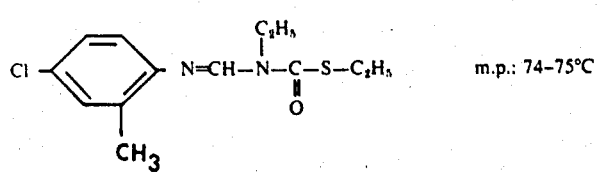
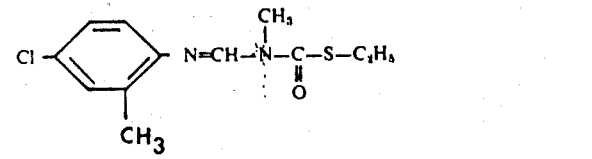
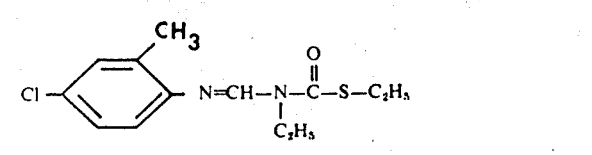
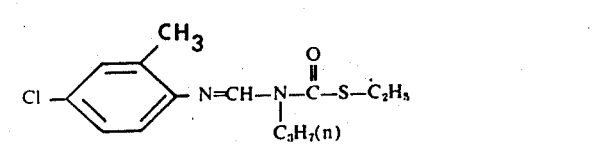
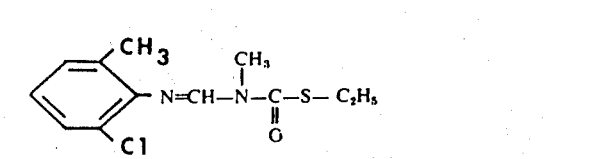
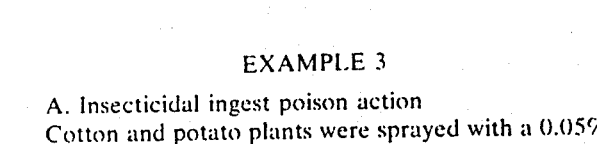

EXAMPLE 3

A. Insecticidal ingest poison action

Cotton and potato plants were sprayed with a 0.05% aqueous emulsion (obtained from a 10% emulsifiable concentrate). After the coating had dried, the cotton plants were populated with *Spodoptera littoralis* or *Heliothis virescens* larvae $L_3$ and the potato plants with Colorado potato beetle larvae (*Leptinotarsa decemlineata*). The test was carried out at 24°C and 60% relative humidity. In the above test, the compounds according to Examples 1 and 2 displayed good ingest poison action against *Spodoptera littoralis*, *Heliothis* and *Leptinotarsa decemlineata*.

B. Systemic insecticidal action

To determine the systemic action, rooted bean plants (*Vicia fabae*) were put into a 0.01% aqueous active substance solution (obtained from a 10% emulsifiable concentrate). After 24 hours, aphids (*Aphis fabae*) were placed on the parts of the plant above the soil. The aphids were protected from contact and gas action by means of a special device. The test was carried out at 24°C and 70% relative humidity. In the above tests the compounds according to Examples 1 and 2 displayed systemic insecticidal action against *Aphis fabae*.

EXAMPLE 4

Action against *Chilo suppresalis*

Six rice plants at a time of the variety Caloro were transplanted into plastic pots (diameter at the top = 17 cm) and reared to a height of about 60 cm. Infestation with *Chilo suppressalis* larvae ($L_1$: 3–4 mm long) took place 2 days after the active substance had been applied in granule form to the paddy water (rate of application: 8 kg of active substance per hectare). Evaluation of the insecticidal action took place 10 days after application of the granules.

The compounds according to Examples 1 and 2 were active in the above test against *Chilo suppressalis*.

EXAMPLE 5

Action against soil insects

Sterilised compost earth is homogeneously mixed with a wettable powder containing 25% of active substance so as to give concentrations of 16, 8, 4, 2, and 1 ppm. Young zuccetti and cabbage plants were planted in the prepared soil and immediately infested with 5 *Aulacophora femoralis* larvae (age: 15 d/25°C) and 15 *Chortophila brassicae* (cabbage fly) eggs. A third corresponding soil sample is provided with slices of apple as feed and populated with 5 Pachnoda savignyi larvae (20 d/25°C).

Mortality inspection is carried out 10 days after application and infestation.

The screening test with caterpillars (Agrotis Y-$L_2$) proceeds in analogous manner, except that the concentrations are 40, 20, and 10 ppm. Mallow leaves are used as feed. In the above test, the compounds according to Examples 1 and 2 were active against *Aulacophora femoralis*, *Chortophila brassicae*, *Pachnoda savigny*, and Agrotis larvae.

EXAMPLE 6

Action against ticks

A. *Rhipicephalus bursa*

Five adult ticks and 50 tick larvae were counted into a glass tube and immersed for 1 to 2 minutes in 2 ml of an aqueous emulsion from an emulsion series each containing 100, 10, 1 and 0.1 ppm of test substance. The tube was then sealed with a standardised cotton wool plug and placed on its head, so that the active substance emulsion could be adsorbed by the cotton wool. In the case of the adults evaluation took place after 2 weeks, and in that of the larvae after 2 days. Each test was repeated twice.

B. *Boophilus microplus* (larvae)

Tests were carried out in each case with 20 OP-sensitive larvae using an analogous dilution series as in the case of test A. (The resistence refers to the tolerability of Diazinon).

The compounds according to Examples 1 and 2 acted in these tests against adults and larvae of *Thipicephalus bursa* sensitive and OP-resistant larvae of *Boophilus microplus*.

EXAMPLE 7

Acaracidal action

*Phaseolus vulgaris* (dwarf beans) have an infested piece of leaf from a mass culture of *Tetranychus urticae* placed on them 12 hours before the test for the acaricidal action. The mobile stages which have migrated are sprayed with the emulsified test preparations from a chromatography atomiser so that the spray broth does not run off. The number of living and dead larvae, adults and eggs are evaluated after 2 to 7 days under a stereoscopic microscope and the result expressed in percentages. During the "interim", the treated plants are kept in greenhouse compartments at 25°C.

The compounds according to Examples 1 and 2 were active in the above test against eggs, larvae and adults of *Tetranychus urticae*.

EXAMPLE 8

Action against soil nematodes

To test the action against soil nematodes, the active substance in the concentration indicated in each case is applied to and intimately mixed with soil infected with root gall nematodes (*Meloidgyne Avenaria*). Immediately afterwards, tomato cuttings are planted in the thus prepared soil in a series of tests and after a waiting time of 8 days tomato seeds are sown in another test series. In order to assess the nematocidal action, the galls present on the roots are counted 28 days after planting and sowing respectively. In this test the compounds according to Examples 1 and 2 display good action against *Meloidgyne Avenaria*.

I claim:

1. A compound of the formula

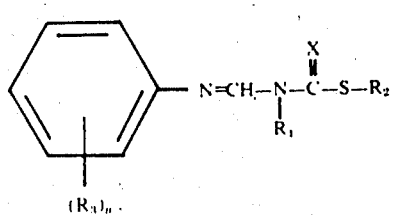

wherein $R_1$ represents hydrogen, alkyl with 1 to 4 carbon atoms, alkenyl with 3 to 4 carbon atoms, alkinyl with 3 to 5 carbon atoms or unsubstituted benzyl, $R_2$ represents alkyl with 1 to 4 carbon atoms, alkenyl with 3 to 4 carbon atoms, alkinyl with 3 to 5 carbon atoms, alkoxyalkyl with 1 to 4 carbon atoms in each of the moieties, alkylthioalkyl with 1 to 4 carbon atoms in each of the moieties, unsubstituted benzyl or benzyl which is substituted by one or more chlorine atoms, $(R_a)_n$ represents one or more similar or different radicals, selected from the group consisting of hydrogen, fluorine, chlorine, bromine, methyl, trifluoromethyl, methoxy, methylthio, ethyl, ethoxy, ethylthio, chloroethyl, propyl, isopropyl, n-butyl, allyloxy, cyano, nitro, dimethylamino, or methoxycarbonyl, $n$ is 1 to 3 and X represents oxygen or sulphur.

2. A compound according to claim 1, of the formula

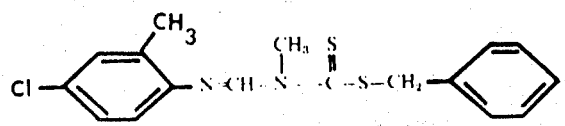

3. A compound according to claim 1, of the formula

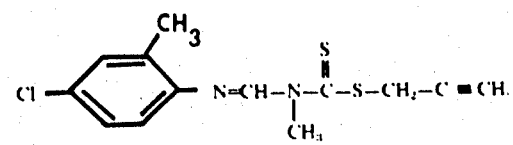

4. A compound according to claim 1, of the formula

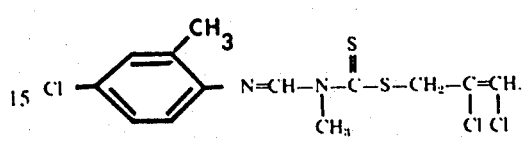

5. A compound according to claim 1, of the formula

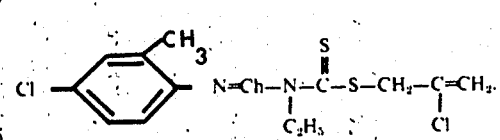

6. A compound according to claim 1, of the formula

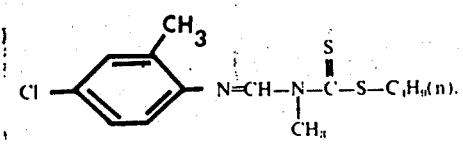

7. A compound according to claim 1, of the formula

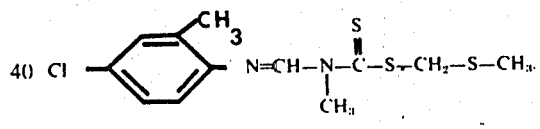

8. A compound according to claim 1, of the formula

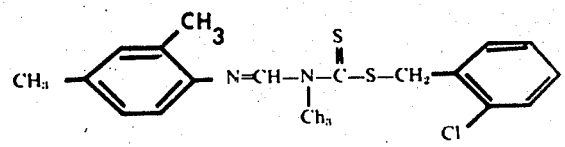

9. A compound according to claim 1, of the formula

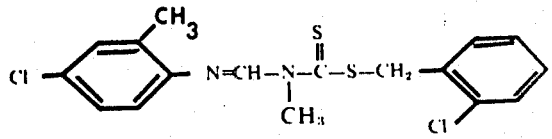

10. A compound according to claim 1, of the formula

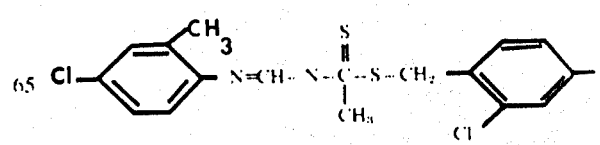

11. A compound according to claim 1, of the formula

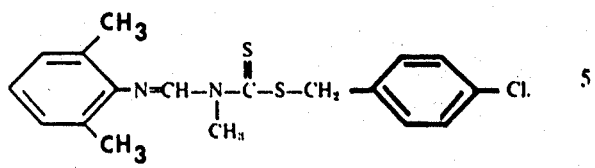

12. A compound according to claim 1, of the formula

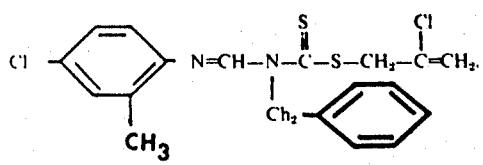

13. A compound according to claim 1, of the formula

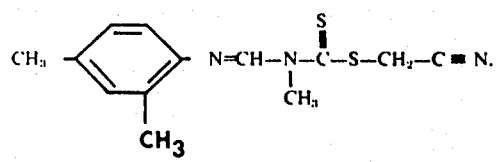

14. A compound according to claim 1, of the formula

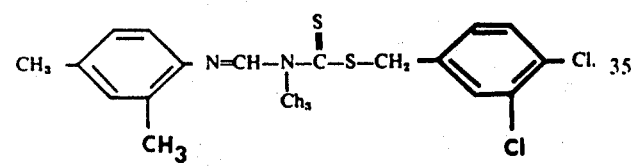

15. A compound according to claim 1, of the formula

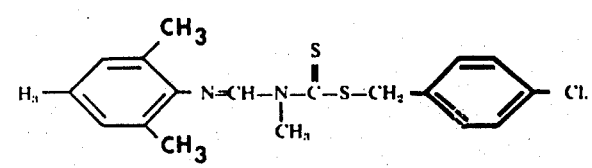

16. A compound according to claim 1, of the formula

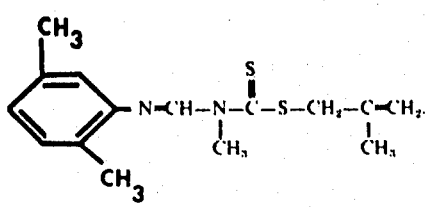

17. A compound according to claim 1, of the formula

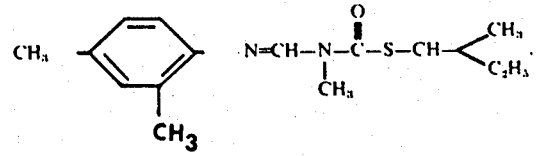

18. A compound according to claim 1, of the formula

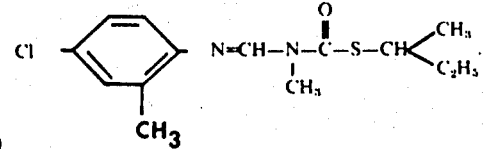

19. A compound according to claim 1, of the formula

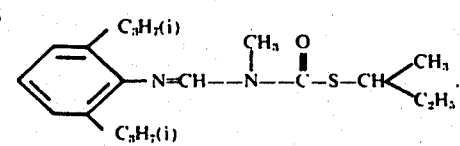

20. A compound according to claim 1, of the formula

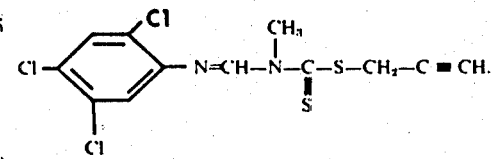

* * * * *

UNITED STATES PATENT AND TRADEMARK OFFICE
CERTIFICATE OF CORRECTION

PATENT NO. : 3,897,474
DATED : July 29, 1975
INVENTOR(S) : Georg Pissiotas

It is certified that error appears in the above-identified patent and that said Letters Patent are hereby corrected as shown below:

Column 18, Claim 5, in the formula, change "N=Ch" to -- N=CH --.

Column 18, Claim 8, in the formula, change "Ch$_3$" to -- CH$_3$ --.

Column 19, Claim 12, in the formula, change "Ch$_2$" to -- CH$_2$ --.

Column 19, Claim 14, in the formula, change "Ch$_3$" to -- CH$_3$ --.

Column 19, Claim 15, in the formula, change "H$_3$" to -- CH$_3$ --.

Signed and Sealed this fourth Day of May 1976

[SEAL]

Attest:

RUTH C. MASON
*Attesting Officer*

C. MARSHALL DANN
*Commissioner of Patents and Trademarks*